Nov. 24, 1931.   L. E. WILLIAMS ET AL   1,833,478
INFLATABLE HOLLOW RUBBER BODY
Filed April 9, 1929
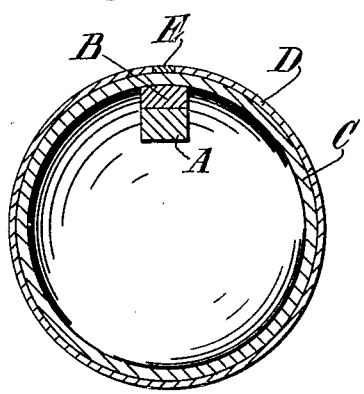
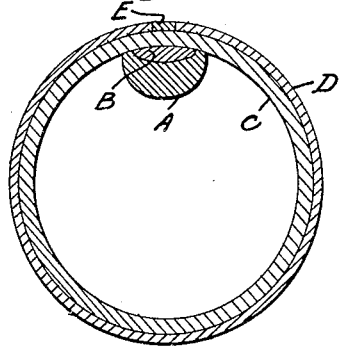
INVENTORS
Leslie Edward Williams
Gilbert Ernest James
ATTORNEYS
Nathan & Bowman Patented Nov. 24, 1931

1,833,478

UNITED STATES PATENT OFFICE

LESLIE EDWARD WILLIAMS, OF LONDON, AND GILBERT ERNEST JAMES, OF BATH, ENGLAND

INFLATABLE HOLLOW RUBBER BODY

Application filed April 9, 1929, Serial No. 353,884, and in Great Britain March 7, 1929.

This invention relates to improvements in inflatable rubber bodies and is particularly applicable to balls such as tennis balls.

Such balls are liable to lose their internal pressure, and to become soft, when kept for any considerable time, especially in hot countries, and to remedy this defect balls have been made having on the internal surface a soft rubber plug, so that a hollow needle attached to a pump can be passed through the ball where the plug is located, for the purpose of reinflating the ball.

The hole made by the needle in this plug will in most cases close, but with the ordinary soft rubber plug this closing may take place so slowly that there is an escape of air, and consequently the pressure falls below that required for the standard ball.

According to one feature of the present invention the lower part of the plug i. e. that projecting furthest into the ball is composed of rubber which is vulcanized to a greater extent than the upper part of such plug, and therefore has greater elasticity.

In consequence of this greater elasticity this part of the plug responds quickly to the pressure within the ball, and constricts the opening made by the needle so that only a small escape of air can take place, but as the rubber is vulcanized this hole will never entirely disappear.

In the soft rubber part of the plug, however, although the action of closing may be slower, the rubber will normally coalesce and so entirely close the opening. This action is probably accelerated by the fact that the soft rubber lies between the elastic lower part of the plug and the elastic outer surface of the ball, which is generally enclosed in expansible cloth covering. A pressure of the finger on the top of the plug also assists in this closing.

In order more fully to explain this invention reference is made to the accompanying drawings wherein Fig. 1 shows the section of a tennis ball having one form of a plug as above described, and Fig. 2 shows a modification.

In such drawing A represents the more highly vulcanized part of the plug, B the soft rubber portion of the same, C the rubber surface of the ball and D the cloth cover. There is preferably a hole made in this cloth cover and a rubber projection E placed opposite to the plug comes level with the surface of the cloth and is vulcanized to it as described in our co-pending application No. 353,882. This projecting portion of the plug may be made smaller than the main part as shewn, which has the double advantage of requiring a smaller hole in the cloth and of ensuring that the needle when pushed in shall keep within the plug.

A convenient method of manufacturing the plug so that the portion B is less highly vulcanized than the portion A, or the main body of the ball, is to omit in the portion B the accelerator which is generally used in producing vulcanization, and also the whole or a considerable part of the sulphur, but if desired the other materials of which this portion of the plug is composed may also be varied from those of the portion A. Such variation may take many forms which are well known to those skilled in the trade. The change in the vulcanization may be sudden or gradual.

As a variant the soft rubber portion B may be made as part of the core itself. In this case it is unnecessary to form any exterior projection as when the cover is vulcanized on this soft rubber will fill the hole.

A variant construction of plug is made up of a plurality of portions composed of vulcanized rubber and less highly vulcanized rubber and/or unvulcanized rubber. For example the upper portion may be composed of vulcanized rubber and the lower portion of less highly vulcanized or unvulcanized rubber.

The portion which is vulcanized to the greater extent may have an extension F, see Fig. 2, in the form of a sleeve or thimble to surround the less highly vulcanized or/and unvulcanized rubber portion or portions. The sleeve or thimble may be a separate component.

What we claim is:—

1. An interior plug for the purpose of reinflating balls bladders and the like in which the lower portion is composed of vulcanized rubber and the upper portion of less highly vulcanized or unvulcanized rubber.

2. A ball provided with a plug as described and claimed in claim 1 and having a cloth covering and an external rubber projection opposite to such plug which projects into an opening in said covering.

3. A tennis ball comprising in combination a plug, said plug having the lower portion thereof composed of vulcanized rubber and the upper portion of less highly vulcanized or unvulcanized rubber, and being secured to the interior of the pressure sustaining wall of the ball; and means on the outside of the ball for indicating the position of said plug.

4. A tennis ball comprising in combination a plug, said plug having the lower portion thereof composed of vulcanized rubber and the upper portion of less highly vulcanized or unvulcanized rubber and being secured to the interior of the pressure sustaining wall of the ball; an opening in the outer cloth cover of the ball opposite to said plug and a projection on the outside of the wall of the ball protruding into said opening.

5. A tennis ball comprising in combination a plug, said plug having the lower portion thereof composed of vulcanized rubber and the upper portion of less highly vulcanized or unvulcanized rubber and being secured to the interior of the pressure sustaining wall of the ball; an opening in the outer cloth cover of the ball opposite to said plug; and a projection on the outside of the wall of the ball which protrudes into said opening, said projection being of smaller area than the main portion of the plug.

6. A tennis ball comprising in combination a plug, said plug having the lower portion thereof composed of vulcanized rubber and the upper portion of less highly vulcanized or unvulcanized rubber and being secured to the interior of the pressure sustaining wall of the ball; an opening in the outer cloth cover of the ball opposite to said plug and a projection on the outside of the wall of the ball protruding into said opening and being vulcanized to said cover.

7. A tennis ball comprising in combination a plug, said plug having the lower portion thereof composed of vulcanized rubber and the upper portion of less highly vulcanized or unvulcanized rubber and being secured to the interior of the pressure sustaining wall of the ball, and a sleeve or thimble to surround said upper portion.

8. A tennis ball comprising in combination a plug; said plug consisting of a lower portion composed of vulcanized rubber and an upper portion of less highly vulcanized or unvulcanized rubber and being secured to the interior of the pressure sustaining wall of the ball; a sleeve or thimble for surrounding the less highly vulcanized or unvulcanized plug portion; and a projection on the outside of the wall of the ball opposite to said plug to indicate the position of the plug.

9. A tennis ball having a plug according to claim 1 wherein the plug is formed of built-up substantially flat layers of vulcanized rubber and less highly vulcanized or unvulcanized rubber.

In testimony whereof, we affix our signatures.

LESLIE EDWARD WILLIAMS.
GILBERT ERNEST JAMES.